(No Model.)
J. R. JORDAN.
TABLE.
No. 484,965. Patented Oct. 25, 1892.
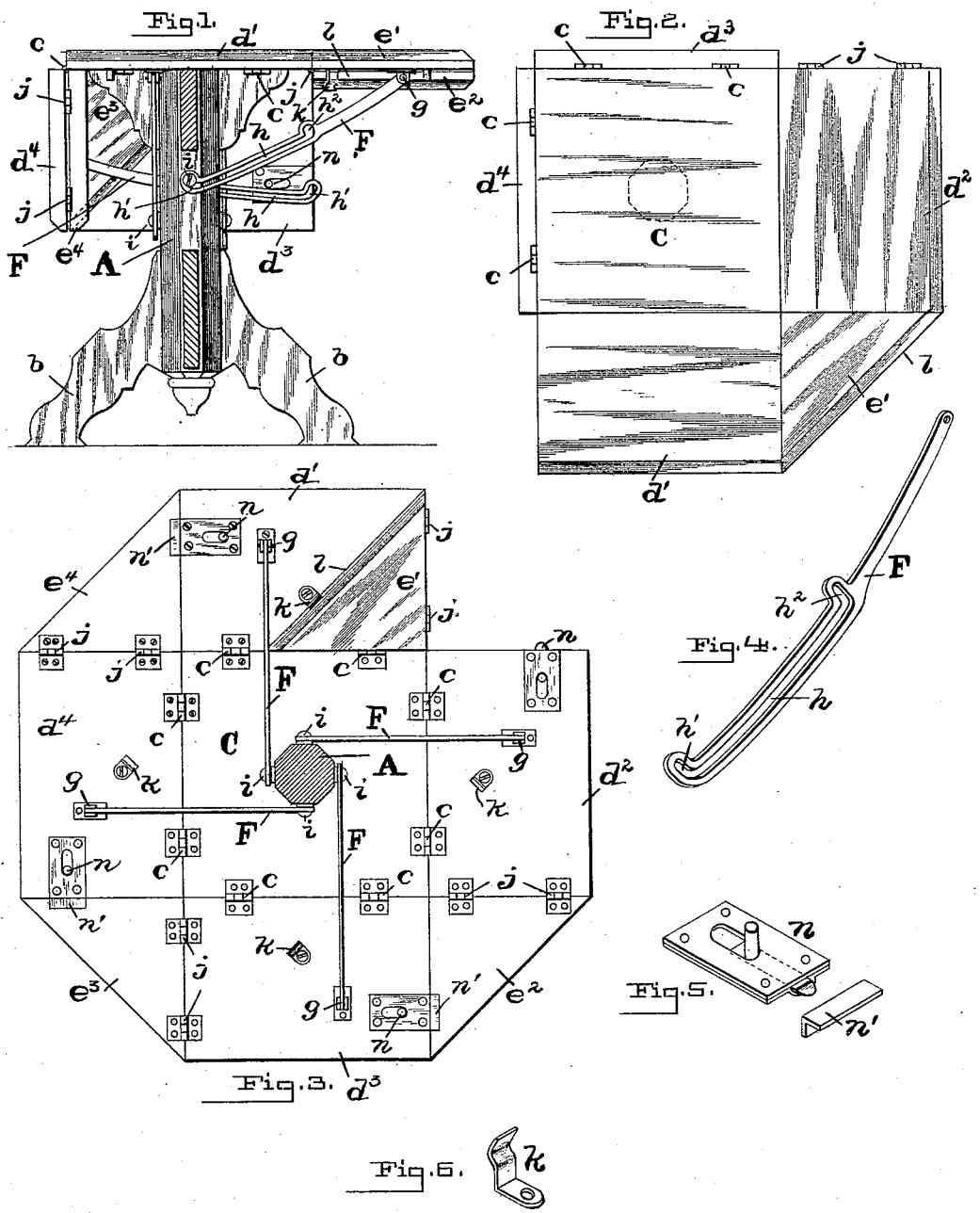
WITNESSES:
A. O. Babendreier
F. Parker Davis.
INVENTOR:
John R. Jordan,
By Chas. B. Mann
Atty

UNITED STATES PATENT OFFICE.

JOHN R. JORDAN, OF BALTIMORE, MARYLAND, ASSIGNOR TO THE JORDAN MULTIPLEX TABLE MANUFACTURING COMPANY, OF SAME PLACE.

TABLE.

SPECIFICATION forming part of Letters Patent No. 484,965, dated October 25, 1892.

Application filed July 21, 1892. Serial No. 440,729. (No model.)

*To all whom it may concern:*

Be it known that I, JOHN R. JORDAN, a citizen of the United States, residing at Baltimore city, in the State of Maryland, have invented certain new and useful Improvements in Tables, of which the following is a specification.

This invention relates to a table having an improved folding top, which will first be described and then claimed.

The invention is illustrated in the drawings, in which—

Figure 1 is a side elevation of the table with the hinged leaves thereof adjusted as shown in Fig. 2. Fig. 2 is an upper side or plan view of the table-top with the leaves adjusted as in Fig. 1. Fig. 3 is an inverted or bottom view of the table-top, braces, and pedestal, the latter in section, all the leaves of the top being spread flat in the same plane, except one auxiliary leaf, which is turned back in contact with a main leaf. Fig. 4 is a view of one of the braces. Fig. 5 is a view of one of the auxiliary-leaf bolts. Fig. 6 is a view of one of the retaining devices which hold the auxiliary leaves when turned back out of use.

The letter A designates an ordinary pedestal or post, which is preferably square or octagonal in shape, and $b$ the feet of the same. The central part C of the table-top is fixed rigidly on the upper end of the pedestal, and this part of the top is rectangular in shape.

Four main leaves $d'$ $d^2$ $d^3$ $d^4$ are secured to the central part by hinges $c$. Each main leaf may thus be adjusted in a horizontal plane flat with the central part in the position in which the leaves $d'$ and $d^2$ are shown in Figs. 1 and 2, or may be adjusted in a vertical pendent position, as the leaves $d^3$ and $d^4$ are shown in Fig. 1.

A brace-bar F is employed to support each main leaf. This brace has one end secured by a joint or pivot $g$ to the main leaf. The brace-bar has a longitudinal slot $h$ extending to its other end, and at each extremity of the slot is a lateral offset $h'$ $h^2$, both of which have an upward direction. The brace-bar of the leaf $d^2$ has position at and extends past one side of the pedestal, while the brace-bar of the leaf $d^4$, on the opposite side, extends past the side of the pedestal opposite that where the first-named brace-bar is located. The same is true of the two opposite brace-bars or leaves $d'$ and $d^3$, all of which is shown in Fig. 3. Thus each of the four brace-bars extends past a different side of the pedestal. It will be seen that each brace-bar F is pivoted to a main leaf not at a point central between its two ends, but at a point located between the center of the leaf and one of its ends. This construction gives room for the auxiliary leaves, hereinafter described, to turn back on the main leaves. A headed screw or pin $i$ passes through the slot $h$ of each brace-bar and into the side of the pedestal A.

When a main leaf is raised, as the leaf $d^2$ is in Fig. 1, the free end of the brace drops a little and the lateral offset $h'$ in the slot at the end of the brace takes onto the screw $i$, and thereby the brace is kept in its extended position and the main leaf is sustained. It will thus be seen the screw $i$ on the pedestal coacts with the brace-bar, and said screw serves, when the brace-bar is extended, as a stop device to prevent the brace-bar from retracting. When the main leaf is lowered, as the leaf $d^4$ is in Fig. 1, the slot of the brace slides along the screw $i$, and then the brace drops a little and the lateral offset $h^2$ in the slot takes onto the screw $i$ and serves to keep the brace retracted and the leaf immovable. Each main leaf has an auxiliary leaf secured by hinges $j$ at the end most remote from the brace-bar. The auxiliary leaves are designated $e'$ $e^2$ $e^3$ $e^4$. The auxiliary leaves fold or turn back on the under side of the main leaves, and when so folded the auxiliary leaves are retained in this position by means of a suitable catch device $k$.

As already mentioned, the brace-bars F are pivoted at the under side of the main leaves nearer the unhinged end thereof, so that the auxiliary leaf, which is hinged at the other end, has ample room to fold back without hinderance of said brace-bars.

The retaining-catch in the present instance consists of a metal spring $k$, secured by a screw to the back of the main leaf and arranged to engage the edge $l$ of the auxiliary leaf when said leaf is turned so that its flat side is in contact with the under side of the main leaf. This catch device $k$, to retain the auxiliary leaf when the latter is not in use, is useful because it secures the auxiliary leaf from movement when it is desired to change the adjustment of the main leaf. If the auxiliary leaves when not in use were free to move, they would sometimes interfere with the movement or adjustment of the main leaves and would render a change of adjustment difficult or impossible. Of course the retaining-catch $k$ may be used without regard to the means that may be employed to support the main leaf. When an auxiliary leaf is raised to serve as a part of the table-top, it is sustained by a bolt $n$, which is located on each main leaf. This bolt is shown in detail in Fig. 5. A metal catch $n'$ is on each auxiliary leaf, and the bolt when projected engages with the catch.

In the present instance the main leaves are rectangular and the auxiliary leaves are triangular in shape, which shape, when all the leaves are up, makes an octagonal-shaped table-top. It is, however, obvious that the leaves may be shaped so as to make the complete table-top circular. My invention is not limited in this respect.

It will be seen that any number of the leaves, or all of them, may be adjusted to serve at the same time as a top. Thus a table of the desired size may be produced at pleasure.

The construction and arrangement of the parts is simple, and all the parts operate readily and conveniently.

Having thus described my invention, what I claim as new, and desire to secure by Letters Patent, is—

1. In a table, the combination of a pedestal, a rectangular-shaped central top part fixed rigidly on the pedestal, four leaves, each hinged to a different one of the rectangular sides of the said central top part, four brace-bars F, each bar having one end attached to a different leaf by a pivot $g$, and each of said bars having a longitudinal slot extending to its other end and said slot provided at each extremity with a lateral or upward extending offset $h'$ $h^2$, and a screw $i$, passed through the slot of each bar and into the side of the pedestal.

2. In a table, the combination of a pedestal, a rectangular-shaped central top part fixed rigidly on the pedestal, four leaves, each hinged to a different one of the rectangular sides of the said central top part, four brace-bars F, each being pivoted to a main leaf nearer to one end of the leaf than the other, and each of the four brace-bars extending past a different side of the pedestal, an auxiliary leaf hinged to each main leaf at the end thereof most remote from the brace-bar, and stop devices on the several sides of the pedestal, coacting with the brace-bars and serving when said bars are extended to prevent them from retracting.

In testimony whereof I affix my signature in the presence of two witnesses.

JOHN R. JORDAN.

Witnesses:
F. PARKER DAVIS,
JNO. T. MADDOX.